March 2, 1948.   P. W. JOHNSON   2,437,160
PIVOTED JAW GAUGE
Filed June 15, 1943

INVENTOR.
Paul W. Johnson
BY
Bohleber, Fassett & Montstream
ATTORNEYS

Patented Mar. 2, 1948

2,437,160

UNITED STATES PATENT OFFICE 2,437,160

PIVOTED JAW GAGE

Paul W. Johnson, Hartford, Conn.

Application June 15, 1943, Serial No. 490,835

18 Claims. (Cl. 33—174)

The invention relates to a gage for testing the assembly ability of a part and has particular applicability as a thread gage. The gage in its preferred form gives a test which is the equivalent of a ring gage test but has the speed of a snap gage as well as other advantages. Other aspects of the invention relate more particularly to a gage for taper parts which may have a smooth surface or may have a taper thread.

It is an object of the invention to construct a gage of the type having pivoted gage members, whether of the straight or taper form, for bringing the gaging surfaces or elements thereof into gaging position and to retain the gage members in the positions in which they are released.

A further object is to make a gage for tapered parts in which one or both gage members having gaging portions engaging a plurality of points on the periphery of the part and at least one of the gage members is movable away from gaging position for insertion of the test part and then one or both members are moved to gaging position with the part therein after which the tapered part is advanced axially for testing its assembly-ability.

Another object of the invention is to construct a gage utilizing a pivoted gage member or members, whether of the straight or taper form, at least one of which is arrested in gaging position.

Another object of the invention is to construct a thread gage for pipe or taper threads of the type utilizing a pivoted gage member or members.

Another object is to construct a gage for taper threads having pivoted gage members with concave gaging portions or means.

A still further object of the invention is to construct a gage for conical or taper parts, and particularly for taper threads, utilizing pivoted gage members and determining whether or not the part under test is within the permissible tolerances.

Other objects of the invention will be more apparent from the following description taken in connection with the accompanying drawing in which Figure 1 is a side elevation of a gage with pivoted gaging members in gaging position and with a section taken through the frame to show the mounting of a locking plunger.

In gaging a round piece, whether cylindrical or conical and whether smooth surfaced or threaded, for assembly ability, the most effective gage heretofore has been a ring style since it determines conclusively whether or not the piece will assemble within its mating part which for a threaded part would be a threaded hole. The reason for this is the complete circumferential engagement of the gage with the part to be tested. Testing any thread with the usual ring style gage consumes considerable time because the test piece must be threaded fully into the ring gage which also induces considerable wear on the gage. Snap gages as heretofore constructed gave speed in gaging the test part or piece but it gave only line contact at diametrically opposite points. A test part may have several deformities affecting assembly ability and yet would be passed as satisfactory by the snap style of gage. The construction of gage herein has all the advantages of a ring gage as to a test for assembly ability in that in its preferred form it is in effect a ring gage and in addition thereto has the speed of a snap gage as well as other advantages such as reduced wear upon the gaging surface or portions.

Figure 1:
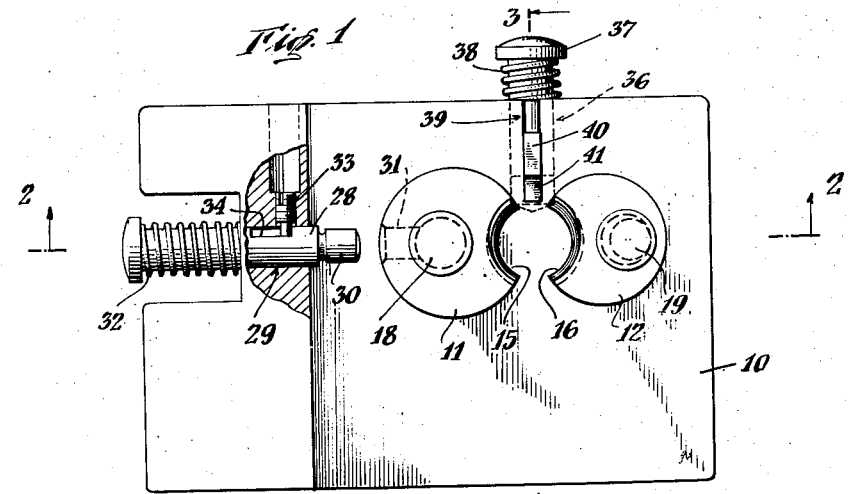

The gage includes a frame 10 of any suitable construction which carries, in the construction of Figure 1, a pair of gage members 11 and 12. Each gage member has a concave gaging surface or portion 15 and 16 respectively. This gaging surface may be plain if the test part is plain or may be threaded, as shown, for a threaded part or piece to be tested. The gaging surface or face may be conical for testing conical parts or a taper or pipe thread. The concave gaging means or face gives gaging contact with a plurality of points on the circumference of the part to be tested. With its continuous concave gaging means illustrated, the gaging contact is nearly complete circumferential contact.

At least one gage member is mounted upon the frame so that it is movable away from gaging position for insertion of a test part and then movable to gaging position with the test part between the gaging surfaces. Preferably the movable mounting is a pivot, the gage member 11 being carried by a pivot pin or stud 18 and gage member 12 being mounted on a pivot pin or stud 19. The pivot pins are spaced from each other and from the axis of gaging position so that the gaging surface or portion may pivot away from gaging position for the insertion of the test part therein whereupon lateral movement of the test part, as it engages the gage member or members, swings or pivots the latter in a return direction with the part therein into gaging position as shown in Figure 1. One or both of the gage members may be adjustable by any desirable adjusting means, that illustrated including an eccentric pivot pin 19 for the gage member 12. This eccentric pin has a bearing 20 which is eccentric with respect to its screw 21 so that by unloosening the nut 22 thereon, the bearing 20 may be rotated to any desired adjusting position. Tightening of the nut retains the bearing or pivot pin in adjusted position.

It is desirable to have a pivoted gage member or members, whether of the straight or taper form, remain in the position in which it is released. This is accomplished by frictional means which engages the pivoted gage member. The particular frictional means illustrated includes a spring washer 25 on the pin 19 which engages the gage member and a like spring washer 26 which engages the pivoted gage member 11. The spring washer provides a drag on the gage member so that it remains in the position to which it is moved and released. With this means for retaining the pivoted gage members in released position, a test part is inserted between the gage members and pressed downwardly to gaging position after which the test part is lifted upwardly which opens the gage members whereupon the friction means retains the gage members in open or released position.

When the piece or part to be tested is conical or has taper threads there are two gaging factors involved, first the axis of the piece must coincide with the axis of the gaging means or portions and secondly there is a relative axial position. It is difficult to position the taper or cone in the correct axial position with respect to the movable gage members merely by lateral insertion of the test part therein. For taper gaging at least one of the gage members should be held or retained in gaging position so that when a conical test part is inserted laterally into the gage means, it is not necessary to accurately position the test piece as to axial position with respect to the gaging means. The test part is inserted at approximately the correct axial position, which insertion takes place laterally where a pivoted gage member is used until it reaches a position where the axis of the part and of the gaging means coincide at which time one of the gage members is held or arrested in that position and the test part is then rotated if a taper thread, or moved axially if it is a plain conical surface, until it is in proper gaging position within the gaging members. Usually only a partial turn is necessary in order to axially advance or bring a threaded tapered test piece to gaging position.

Holding one of the gage members in gaging position for the testing of straight and plain or threaded parts is also desirable such as when a shake test of the part is given. This test involves inserting the part to be tested within the gage and then holding or arresting at least one of the gage members in gaging position whereupon the part is shaken by lateral pressure. The arresting means illustrated and described is suitable for this test. Taper parts may be given the same shake test.

Suitable means may be provided for arresting one of the gage members in gaging position, that particularly illustrated in Figure 1 being a selective and locking type of retaining means. It includes a plunger 28 which is slidable in a hole 29 in the frame and upon the end of which there is an aligning nub 30. The aligning nub is received in aligning hole 31 provided in the pivoted gage member 11. A spring 32 normally retains the plunger in retracted position. A limit screw or stop 33 riding in a slot 34 in the plunger may be provided for holding the plunger in the frame. This arresting means is selective in that the gaging member may be limited in its movement so that it does not pass beyond gaging position or the test piece or part may pass on through gaging position whichever test procedure is desired. It is also a locking means in that the gage member is held in gaging position against rotation in either direction. Where a locking type of means is used to retain one gage member in gaging position, this gage member preferably is not made adjustable with an eccentric style of pivot pin in order to assure accurate alignment of the nut 30 with the hole 31.

A test part is inserted laterally as previously described between the pivoted gage members and the inspector presses upon the plunger 28. The end of the plunger rides upon the outer surface of the gage member 11 until it comes into alignment with the hole 31 whereupon the end of the plunger or particularly the nub 30 enters the hole and arrests the gage member 11 in gaging position. The gage member 12 is also necessarily held in gaging position by the test part. The test part is then pushed forwardly if it has a smooth surface or rotated if it has a taper thread until it is snug or gaging tight within the gage. The test part is then in gaging position. It is clear that both gage members may be arrested in gaging position if desired.

Means are provided to determine whether or not the test part or piece is within the allowable tolerances. This means may be a sight means or it may be a feeler style of means. The latter form is shown in Figure 1. The frame 10 is provided with a hole 36 which slidably receives a tolerance plunger 37. A spring 38 normally retains the tolerance plunger in retracted or elevated position. The frame carries a slot 39 communicating with the hole 36 through which projects a tolerance slide having a plurality of lands namely 40 and 41 which form tolerance shoulders. A screw or stop 42 is received in a slot 43 in the plunger 37 to slidably retain the latter within the frame. With a test part in gaging position as described hereinbefore, the plunger 37 is depressed. If the land 41 cannot pass the end of the test part then the latter is too small and is rejected. If when the test part is in gaging position, the land 41 will pass the end of the test piece, but the land 40 will not pass and the part engages the shoulder, then the test piece is within the tolerances allowed. If upon depression of the plunger 37 both of the lands 41 and 40 pass between the end of the test part then the latter is too large. This tolerance plunger provides a feel test as to whether or not a part under test is within the permissible tolerances. The inspector can tell by the extent of the depression of the plunger 37 whether or not the test part is within the required tolerances or is too small or too large. It is clear that the plunger may include a greater number of lands than the two illustrated for selective gaging of parts to be grouped as of the same or substantially the same size.

Figure 5:
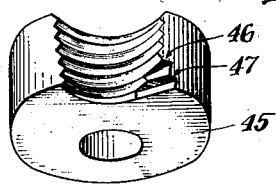
Figure 5 is a view in perspective of a pivoted gage member having a concave gaging portion with a sight tolerance means thereon.

A visual test as to whether or not a test part is within the allowable tolerances utilizes a form of gage member 45 illustrated in Figure 5. This gage member may be substituted for either of the gage members 11 or 12 although preferably it is provided in the position of the gage member 12. With this style of gage member the test part is inserted laterally into the gaging portions or means and pressed downwardly to gaging position whereupon the plunger 28 retains the gage member 11 in gaging position. The test part is then advanced axially if it is a plain surface cone or rotated if it is a taper thread until the test part is in gaging position axially of the gaging surfaces. The inspector then sights the end of the test part and if it falls between the shoulder 46 and shoulder 47 then the test part is within the allowable limits. If the end of the test part is short of the shoulder 46 then it is too large and if it falls beyond the shoulder 47 then the test part is too small. It is clear that a single land or shoulder is adequate since the end of the gage member may provide a second sighting shoulder for determining whether or not the test piece is too small. Also if selective gaging is desired in order to select groups of parts of the same or approximately the same size then a greater number of shoulders or steps may be provided.

The means for pivotally supporting the gaging members such as the pivot pins 18, 19 and 52 are located so that the axis of gaging position lies between one of the gaging members such as 11 or 55 and the pivotal supporting means of the other gaging means namely 19 or 52 respectively. The axis of gaging position is the point represented by the center of the concave gaging means 15 and 16 in the position shown in Figure 1 and the center of the test part P in Figure 4. This axis may also be defined as the center of a test part in the gage of Figure 1 resting between the gaging means 15 and 16 in the position illustrated in Figure 1. With the pivotal supporting means so located, the gaging means 15 and 16 as well as the gaging means represented by the rollers 53 and 54 of Figure 4 face radially or may be substantially radially outwardly from its respective pivot pin, that is it faces in a radially outward direction when viewed from the respective pivot pin. Also because of this location for the pivotal supporting means the gaging means 15 and 16 as well as the gaging means 53, 54 swing sidewise or upon a circular path, by virtue of the pivot, which is spaced radially from the other gaging member. In other words the path of pivotal movement of the gaging means 15 has one radial distance from its pivot 18 and the other gaging member 12 and its gaging means 16 is at a greater distance from the pivot 18 or is radially spaced therefrom. The same is true of the circular path of movement of the gaging means 53, 54 with respect to its pivot 52 and the other gaging member 55.

It has been described hereinbefore that the usual style of snap gage gives line contact with the test piece. Not only does it give line contact but one pass of the test piece between the gage members tests only one diameter thereof. If this is the only test made of the part or piece, the latter may be eccentric in which case it may pass the gage when as a matter of fact a test at another diameter may show it to be too large and hence unable to be assembled upon a nut or in a threaded hole. The snap ring gage illustrated in Figure 1 will test for eccentricity as well as other thread deformities and it accomplishes this by providing a plurality of points of contact with the test part and for a concave portion it provides a continuous contact around most of the periphery of the test part.

Figure 3:
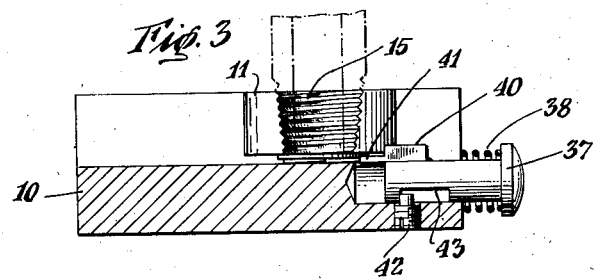
Figure 3 is a section taken at line 3—3 of Figure 1 showing the construction of a feeler type of tolerance determining plunger.
Figure 4:
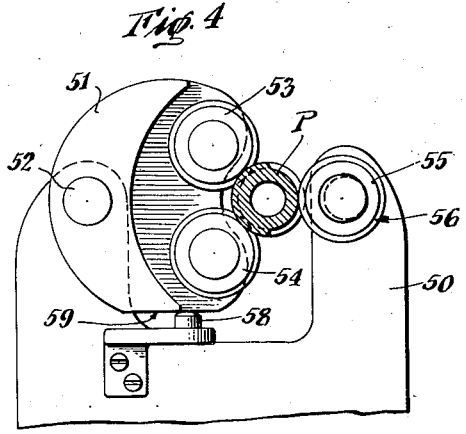
Figure 4 is a side elevation of another form of gage which uses a pivoted gage member but with convex gaging portion or means.

A gage capable of testing for eccentricity and other thread deformities may be constructed in which the gaging surface or face is not concave but is convex. This style of gage is illustrated in Figure 4. This gage utilizes a frame 50 which may be of U-shaped construction in one arm of which a gage member 51 is mounted on a pivot or stud 52. The pivoted gage member carries a pair of gaging means or portions which are preferably gaging rollers 53 and 54. The other arm of the frame may have a similar pivoted gage member if desired which would give a four point contact around the periphery of the test piece. There is illustrated, however, a single cooperating gage member or roller 55 in which case the gage gives line contact with the test part at three points on the periphery which is sufficient as a test for eccentricity. The gage member 51 pivots upwardly to open the same for insertion of the test part and then by pressing the same downwardly, the gage member swings to gaging position shown in Figure 4. The gaging rollers or elements may be conical or angularly mounted to test a conical part. The rollers may be smooth for a smooth surface piece or they may be threaded or ridged in order to test a thread of either straight or taper form. The gage illustrated is used in the same manner as the gage illustrated in Figure 1. With this style of gage a sight style of tolerance means may be provided or the feeler type as desired. One of the rollers such as the roller 55 carries a circumferential sighting land 56 or lands which function like the lands 46 and 47 of Figure 3 for determining whether or not the test part is within the allowable tolerances.

Figure 2:
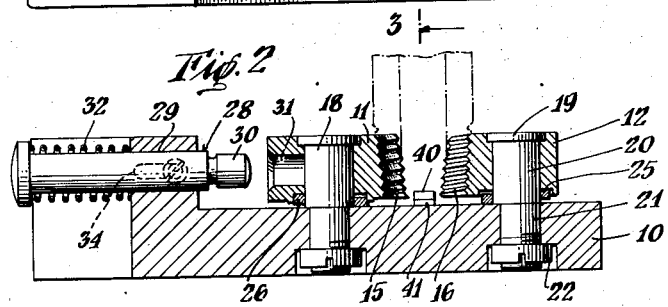
Figure 2 is a section taken at line 2—2 of Figure 1 through the pivoted gage members and shows the mounting thereof.

The gage of Figure 4 is provided with means to arrest the pivoted gage member 51 in gaging position. The means illustrated comprises a stop 58 which engages a surface 59 on the pivoted gage member 51. The arresting means illustrated in Figure 4 is not of the selective type which is shown in the construction of Figure 1, although the latter type may be used here. In other words, the stop which arrests the gage member in gaging position is fixed and prevents the same from pivoting beyond this point. Means may be provided to retain the gage member 51 in released position, after the test part P has been inserted to gaging position and then moved upwardly to remove the same from the gage. The friction washer of the construction of Figures 1–3 is used for this purpose. The pivoted gage member is, therefore, retained in open or released position and is ready to receive a second test piece for gaging.

In the constructions shown in Figures 1, 2, 3 and 4, the pivots 18, 19 and 52 of the pivoted gage members 11, 12 and 51 respectively, are located to the rear of the gaging means or surfaces 15 and 16 and the gaging rollers 53 and 54 when the gaging axis is considered the front thereof. The pivots 18, 19 and 52 may also be considered as being centrally of or in the central region of an angle defined by drawing a line from the gaging axis to the effective end of each of the gaging surfaces 15 and 16, that is, in the particular construction illustrated in Figure 1 the effective end is each intersection of the circle formed by the concave gaging means or surfaces 15 and 16 with the outer circle of its gage member. The effective end for the construction of Figure 4 would be defined by a line extending through the gaging axis and the center of each gaging roller 53 and 54.

The invention is presented to fill a need for improvements in a gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame, a pair of gage members cooperating together at least one of which has gaging means which test a part at a plurality of points upon the circumference thereof, means pivotally supporting the gage members which have gaging means for testing a plurality of points upon the part to be tested, at a point spaced from the axis of gaging position so that at least one gage member pivots away from gaging position to open the same for insertion of a part to be gaged and pivots into gaging position, means to retain a pivoted gage member in gaging position, a plunger slidably mounted in the frame adjacent gaging position and a pair of tolerance lands carried by the plunger for projection towards the end of the part in gaging position.

2. A gage comprising a frame, a pair of complementary gage members each having a concave tapered gaging portion, means pivotally supporting each member at spaced points so that the concave gage members pivot away from each other to open the same for insertion of a part to be gaged and pivot towards the other into gaging position and means to retain a gage member in gaging position.

3. A gage comprising a frame, a pair of complementary gage members each having gaging means which engage the part to be tested at a plurality of points on its circumference, means pivotally supporting each member at spaced points so that the gage members pivot away from each other in one direction to open the gaging means for insertion of a part to be gaged then pivot in the other direction into gaging position, and means engaging the gage members to retain the same in the position in which they are released.

4. A gage comprising a frame, a pair of complemental gage members each having a concave gaging portion, means pivotally supporting each gage member at spaced points so that the concave gage members pivot away from each other to open the same for insertion of a part to be gaged and pivot towards each other into gaging position, and means frictionally engaging the gage members to retain the same in the position in which they are released.

5. A gage comprising a frame, a pair of gage members cooperating together and having taper concave gaging means, means pivotally supporting each gage member at a point spaced from the axis of gaging position so that the gage members pivot away from gaging position to open the same for insertion of a part to be gaged and pivot in the opposite direction into gaging position, means to retain a pivoted gage member in gaging position, a plunger slidably mounted in the frame adjacent the small end of the taper gaging means, and tolerance lands carried by the plunger adapted to be projected towards the end of a test part in gaging position.

6. A gage comprising a frame, a pair of gage members cooperating together and having taper concave gaging portions, means pivotally supporting each gage member at a point spaced from the axis of gaging position and for wide angle movement so that the gage members pivot away from gaging position to open the gaging means for insertion of a part to be gaged and pivots in the opposite direction into gaging position, means to lock one pivoted gage member in gaging position, and the pivotal supporting means for the other gage member being eccentric to adjust the position thereof.

7. A gage comprising a frame, a gage member having gaging means which test a part at a plurality of points around the circumference thereof, a second gage member cooperating with the first gage member, means pivotally supporting the first gage member at a point spaced from the axis of gaging position and located so that this axis lies between the second gage member and the pivotal supporting means of the other gage member with the gaging means facing substantially radially outwardly from its pivotal supporting means and so that at least one gage member pivots away from the other to open the same for insertion of a part to be gaged and pivots in the other direction into gaging position upon a circular path radially spaced from the other gaging member, and means to arrest a pivoted gage member in gaging position.

8. A gage comprising a frame, a pair of gage members cooperating together at least one of which has gaging means which test a part at a plurality of points around the circumference thereof, means pivotally supporting each gage member which has gaging means for testing a plurality of points around the part to be tested, at a point spaced from the axis of gaging position and located so that this axis lies between one of the gage members and the pivotal supporting means of the other gage member with the gaging means facing substantially radially outwardly from the pivotal supporting means and so that at least one gage member pivots towards and away from gaging position upon a circular path radially spaced from the other gaging member, and means manually positionable to control the arresting of a pivoted gage member in gaging position.

9. A gage comprising a frame, a pair of gage members cooperating together at least one of which has gaging means which test a part at a plurality of points around the circumference thereof, means pivotally supporting each gage member which has gaging means for testing a plurality of points around the part to be tested, at a point spaced from the axis of gaging position and located so that this axis lies between one of the gage members and the pivotal supporting means of the other gage member with the gaging means facing substantially radially outwardly from the pivotal supporting means and so that at least one gage member pivots towards and away from gaging position upon a circular path radially spaced from the other gaging member, and means manually positionable to arrest a pivoted gage member in gaging position.

10. A gage comprising a frame, a pair of gage members cooperating together at least one of which has gaging means which test a part at a plurality of points around the circumference thereof, means pivotally supporting each gage member which has gaging means for testing a plurality of points around the axis of gaging position at a point spaced from the axis of gaging position and located so that this axis lies between one of the gage members and the pivotal supporting means of the other gage member with the gaging means facing substantially radially outwardly from the pivotal supporting means and so that at least one gage member pivots towards and away from gaging position upon a circular path radially spaced from the other gaging member, and fixed means engaged by a pivoted gage member to limit the pivotal movement to gaging position.

11. A gage comprising a frame, a pair of gage members cooperating together at least one of which has gaging means which test a part at a plurality of points around the circumference thereof, means pivotally supporting each gage member which has gaging means for testing a plurality of points around the part to be tested, at a point spaced from the axis of the work in normal gaging position and located so that this axis lies between one of the gage members and the pivotal supporting means of the other gage member with the gaging means facing substantially radially outwardly from the pivotal supporting means and so that at least one gage member pivots towards and away from gaging position upon a circular path radially spaced from the other gaging member, means to arrest a pivoted gage member in gaging position, and means to determine the relative axial position of the end of the part to be tested with respect to the gaging means.

12. A gage comprising a frame, a plurality of complementary gage members each having a concave gaging portion, means pivotally mounting at least one member at a point spaced from the axis of gaging position and located so that this axis lies between one of the gage members and the pivotal supporting means of the other gage member with the gaging means facing substantially radially outwardly from the pivotal supporting means and so that the concave gage member may move towards and away from gaging position upon a circular path radially spaced from another gaging member, and means manually positionable to control the arresting of one of the gaging members in gaging position.

13. A gage comprising a frame, a pair of gage members cooperating together and having taper concave gaging portions which test a taper part at a plurality of points around the circumference thereof, means pivotally supporting each gage member at a point spaced from the axis of gaging position and located so that this axis lies between one of the gage members and the pivotal supporting means of the other gage member with the gaging means facing substantially radially outwardly from the pivotal supporting means and so that the gage members may pivot towards and away from gaging position upon a circular path radially spaced from the other gaging member, means to arrest a pivoted gage member in gaging position, and means to determine the relative axial position of the end of the part to be tested with respect to the gaging means.

14. A gage comprising a frame, means cooperating together to gage a part including a gage member having a taper concave gaging portion, means pivotally supporting the gage member at a point spaced from the axis of gaging position and located so that this axis lies between one of the gage members and the pivotal supporting means of the other gage member with the gaging means facing substantially radially outwardly from the pivotal supporting means and so that the gage member pivots towards and away from gaging position upon a circular path radially spaced from the other gaging member, and means to lock a pivoted gage member in gaging position.

15. A gage comprising a frame, a pair of cooperating means including at least one gage member having a pair of spaced gaging rollers carried thereby to gage a test part at a plurality of points around the circumference thereof, means pivotally supporting each gage member having a pair of spaced gaging rollers upon the frame at a point spaced from the axis of gaging position and located so that this axis lies between one of the gage members and the pivotal supporting means of the other gage member with the gaging means facing substantially radially outwardly from the pivotal supporting means and so that the gage member may pivot towards and away from gaging position upon a circular path radially spaced from the other gaging member, and stop means engaging a pivoted gage member when in gaging position.

16. A gage comprising a frame, a pair of cooperating gage means including at least one gage member having a pair of spaced gaging rollers carried thereby to engage a test part at a plurality of points around the circumference thereof, means pivotally supporting each gage member having a pair of spaced gaging rollers upon the frame at a point spaced from the axis of gaging position and located so that this axis lies between one of the gage members and the pivotal supporting means of the other gage member with the gaging means facing substantially radially outwardly from the pivotal supporting means and so that the gage member may pivot towards and away from gaging position upon a circular path radially spaced from the other gaging member, stop means engaging a pivoted gage member when in gaging position, and means to determine the relative axial position of the end of the test part with respect to the gaging means.

17. A gage comprising a frame, a gaging roller carried by the frame, a gage member, a pair of spaced gaging rollers carried by the gage member to engage a test part at a pair of points around the periphery of a test part, the gaging rollers having a taper to gage a taper part, means pivotally supporting the gage member upon the frame at a point spaced from the axis of gaging position and located so that this axis lies between one of the gage members and the pivotal supporting means of the other gage member with the gaging means facing substantially radially outwardly from the pivotal supporting means and so that the gage member may pivot towards and away from gaging position upon a circular path radially spaced from the other gaging member, and stop means engaging the pivoted gage member when in gaging position.

18. A gage comprising a frame, a gaging roller carried by the frame, a gage member, a pair of gaging rollers carried by the gage member spaced to engage points around the periphery of a test part, the gaging rollers having a taper to gage a taper part, means pivotally supporting the gage member upon the frame at a point spaced from the axis of gaging position and located so that this axis lies between one of the gage members and the pivotal supporting means of the other gage member with the gaging means facing substantially radially outwardly from the pivotal supporting means and so that the gage member may pivot towards and away from gaging position upon a circular path radially spaced from the other gaging member, stop means engaging the pivoted gage member when in gaging position, and means to determine the relative axial position of the end of the test part with respect to the gaging means.

PAUL W. JOHNSON.

REFERENCES CITED

The following references are of record in the file of this patent:

UNITED STATES PATENTS

| Number | Name | Date |
| --- | --- | --- |
| 987,942 | Bariquand | Mar. 28, 1911 |
| 1,337,018 | Lockey et al. | Apr. 13, 1920 |
| 1,491,613 | Miller | Apr. 22, 1924 |
| 1,630,690 | Bosle | May 31, 1927 |
| 1,908,253 | Johnson | May 9, 1933 |
| 1,949,767 | Thompson | Mar. 6, 1934 |

FOREIGN PATENTS

| Number | Country | Date |
| --- | --- | --- |
| 102,573 | Great Britain | Dec. 14, 1916 |
| 124,001 | Great Britain | Mar. 20, 1919 |